July 1, 1969
R. W. HOAG
3,452,505
METHOD AND MACHINE FOR MAKING AND
FILLING TUBULAR CONTAINERS
Filed April 5, 1966
Sheet 1 of 2
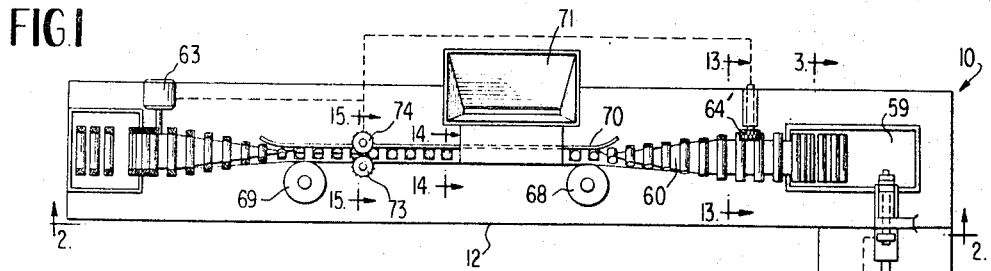
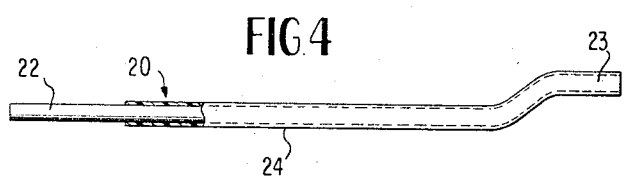
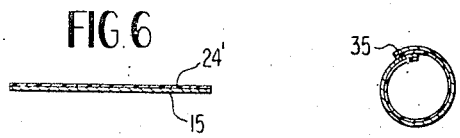
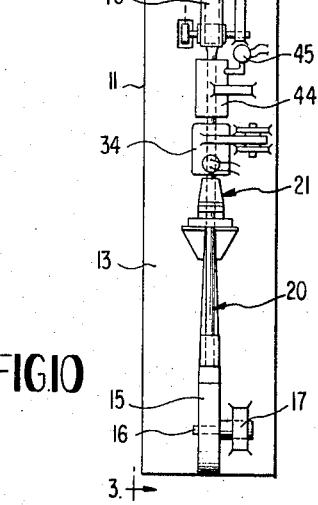
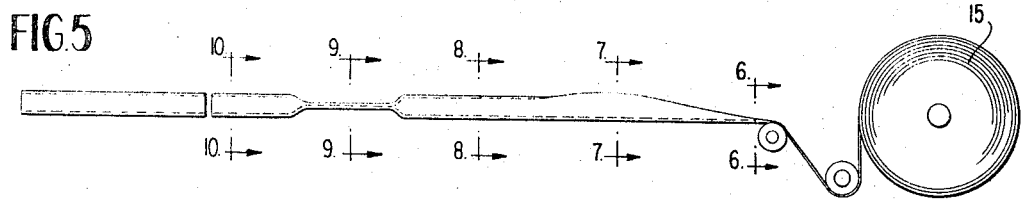
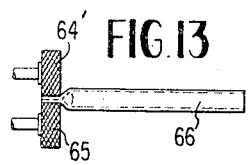
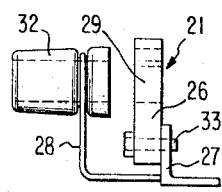
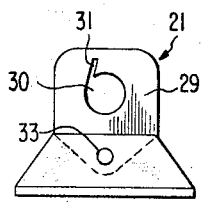
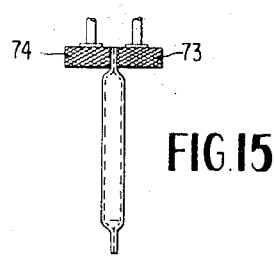
INVENTOR
RODERICK W. HOAG
BY *Dennison & Dennison*
ATTORNEYS

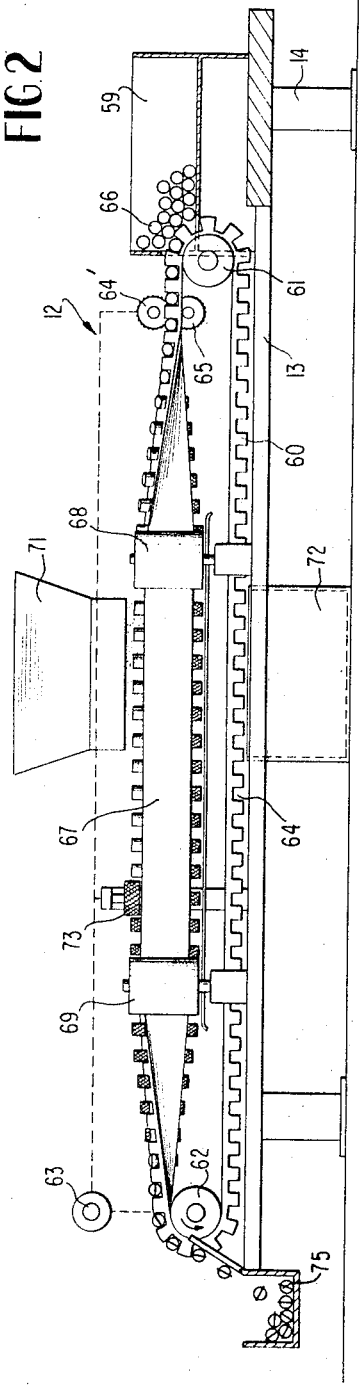

United States Patent Office 3,452,505
Patented July 1, 1969

3,452,505
METHOD AND MACHINE FOR MAKING AND FILLING TUBULAR CONTAINERS
Roderick W. Hoag, 19 Lupine Road,
Andover, Mass. 01810
Filed Apr. 5, 1966, Ser. No. 540,334
Int. Cl. B65b 43/00, 5/02, 1/02
U.S. Cl. 53—29                                  12 Claims

ABSTRACT OF THE DISCLOSURE

A machine for forming, filling and sealing tubular containers including a forming section in which web supply material is passed beneath a mandrel member and through a tapered die so as to wrap the material about itself into a convolute tube. A continuous longitudinal heat seal is applied, the tube cooled and severed by a fly cutter into tube sections which are deposited in a hopper in an independent filling and sealing section of the machine. Each tube section is picked up in a pocket of an endless rubber belt with opposed ends of the tube section extending past the belt edges. A pair of heated crimping rollers seals one edge of the tube section and the belt is then deflected to vertically orient the tubes with the open ends on top where they pass beneath a filling dispenser. Another pair of heated crimping rollers then seal the top and the tubes are removed from the belt.

---

This invention relates generally to a method and machine for making and filling packages.

The instant invention is more specifically concerned with the manufacture and filling of single use containers for individual portions of food, drugs, and other products both of a granulated solid and liquid nature, packaged for convenience, protection against contamination and moisture damage. A package such as described is the subject matter of my copending application, entitled, "Container for Granular Material," Ser. No. 442,028, filed Mar. 23, 1965, now Patent No. 3,263,863. This package is primarily made of paper or plastic material and is in tubular form having the stored commodity disposed therewithin and having the ends sealed. The tube is formed of a flat sheet of material and hence a longitudinal seal is also required. The present invention is primarily concerned with both the machine and method for manufacturing, filling, and sealing such containers as above described in a rapid manner.

It is, accordingly, a primary object of this invention to provide a machine for manufacturing hollow tubular containers, filling the same with material to be dispensed and sealing the ends thereof.

Another object of the instant invention is to provide a machine for converting a travelling web of flat flexible material into tubular form, filling the tube with a given commodity, and sealing the tube to provide filled individual packages.

Another object of this invention is to provide a high speed machine for packaging products in flexible film wherein the filling operation is performed remote from the sealing operation.

A still further object of the instant invention is to provide a machine for making and filling tubular containers wherein the filling operation is independent of the forming operation, and will permit shutdown of the forming operation while filling continues.

Yet another object of the instant invention is to provide a machine for filling tubular containers which will fill such containers completely with little waste of the product.

Another object of the invention is to provide a machine for manufacturing dispensing tubelets which operates at high speed using a minimum of packaging material and which occupies a relatively small amount of space.

An object of this invention is to provide an improved method of manufacture, consisting of a sequence of operations for converting a travelling web of flat, flexible, composite material into convolute wound tubes having a sealed longitudinal seam, sealing one end of each tube, filling the tubes with a commodity, and sealing the opened end of each tube to provide individual filled packages.

An additional object of this invention is to provide a package making, filling, and sealing machine which is of relatively simple construction, is trouble free in operation, and is convenient, safe, and efficient in use.

For yet other objects of the invention and for a better understanding thereof, reference may be had to the following detailed description taken in conjunction with the accompanying drawings which illustrate the best mode now contemplated for carrying out the invention and in which;

FIGURE 1 is a plan view of the machine of the present invention;

FIGURE 2 is a front view of the sealing and filling portion of the machine taken along the line 2—2 of FIGURE 1;

FIGURE 3 is a side view of the tube forming portion of the machine disclosing the initial steps of tube formation taken along the line 3—3 of FIGURE 1;

FIGURE 4 is a front view of the partially covered mandrel about which the treated web is wound in the first steps of the operation to form the tube;

FIGURE 5 is a front elevation of the treated web showing its condition as it is sequentially moved through the machine at the beginning of the process and acted upon to produce unfilled tubes with open ends;

FIGURE 6 is an enlarged cross-sectional view of the web material as it initially passes into the machine taken along line 6—6 of FIGURE 5;

FIGURE 7 is an enlarged cross-sectional view showing the web material as it is initially formed by the mandrel taken along the line 7—7 of FIGURE 5;

FIGURE 8 is an enlarged sectional view taken along line 8—8 in FIGURE 5 showing the web material wound into convolute form;

FIGURE 9 is an enlarged cross-sectional view taken along line 9—9 of FIGURE 5 showing the tube in flattened condition;

FIGURE 10 is an enlarged cross-sectional view taken along line 10—10 of FIGURE 5 showing the tube after it has been manipulated to restore it to tubular form from the flattened condition shown in FIGURE 9;

FIGURE 11 is a side view of a die assembly which serves to form the moving web about the covered mandrel during the tube forming operation;

FIGURE 12 is a front view of the die assembly shown in FIGURE 11;

FIGURE 13 is a sectional view taken along line 13—13 of FIGURE 1 showing the end sealing means;

FIGURE 14 is a sectional view taken along line 14—14 of FIGURE 1 showing a convolute tube having one end sealed and having been filled with a commodity;

FIGURE 15 is a cross-sectional view taken along line 15—15 of FIGURE 1 showing a filled tube passing through a pair of sealing rollers; and FIGURE 16 is a perspective view of a completed tubular container made by the apparatus and method of the instant invention.

Reference is now made more specifically to the drawings, wherein like numerals designate similar parts through the several views and wherein the machine constituting the subject matter of this invention is designated generally at 10.

The entire machine assembly is preferably laid out on the plant floor in an L-shaped configuration and includes two main subassemblies; namely, the tube forming subsection 11 and the tube filling and sealing subsection 12. Each of the subassemblies includes a base plate 13 spanning and mounted upon spaced pedestals 14 which serve to support the base plate above the plant floor surface. A supply roll of the stock web material 15 is mounted on a spindle 16 extending from a vertical support standard 17 which is in turn mounted upon the base plate 13 of the tube forming subassembly. The web material, as more completely described in the above-noted copending patent application, comprises a base substrate of paper, plastic, or other tearable, bendable material and an outer film liner superimposed thereon and preferably laminated thereto. It has been found that polyethylene is suitable for this purpose. However, other films such as "Saran" (polyvinylidene chloride), cellulose acetate, coated cellophane, and "Pliofilm" (rubber hydrochloride) have been used. In the supply roll 15, the coating is on the outside of the convolutions. The free end of the web material passes beneath a first idler roller 18 and over an additional idler roller 19 and then beneath a mandrel assembly 20 and through a die assembly 21.

Mandrel assembly 20 is more clearly shown in FIGURE 4 and comprises a generally elongated rod 22 formed of steel or other suitable material having an offset end portion 23. The major length of the mandrel is coated with Teflon, or in the alternative, has a sleeve composed of Teflon 24 placed thereabout. The Teflon, due to its inherent self lubricating characteristic, enables the coated portion $24^1$ of the web material 15 to pass thereover and be formed therearound with a minimum of friction. The rearward offset portion 23 of the mandrel is received in a tubular sleeve support 25 mounted upon and spaced above the base plate 13 as more clearly shown in FIGURE 3. The intermediate portion of the mandrel assembly passes through an aperture formed in brass support plate 26 which is mounted by means of an L-shaped bracket 27 upon the bed plate 13. This plate and bracket comprise a portion of the die assembly 21 which also includes a forwardly extending bracket 28 carrying at its upper end the tapered die member 29. Die 29 has an aperture 30 therethrough through which the mandrel assembly extends and through which the moving web of material 15 is adapted to pass. Aperture 30 has a tangential cutaway extension 31 communicating therewith which serves to form the overlap portion of the web in the formation of the convolute tube. As the material passes through the die plate 29, the action of the die aperture 30 and extension 31 gradually roll the material as more clearly shown in FIGURE 5 and the cross-sectional views of FIGURES 6, 7, and 8. The material then passes through a tapered torpedo 32 which forms a part of the die assembly. The torpedo serves to bring the rolled material down to the proper size as the convolute formed tube passes therethrough. It will be seen that the action of the die plate and the torpedo serve to actually cause the stock material 13 to form a curl about the mandrel assembly at a point spaced considerably rearwardly of the die plate. It is to be understood that the die opening 30 and extension 31 can be varied in size in order to form larger or smaller diameter tubular containers. For this reason, the die assembly is removably secured to bracket 27 by means of removably fastener means 33 (see FIGURES 11 and 12).

Since the composite web material includes a coating, which upon the application of heat and pressure, serves to adhesively secure the composite web to itself or to another suitable surface for which it has an affinity, some means must be provided at this station of the assembly to cause a longitudinal heat and pressure seal along the endless convolute tube. For this purpose, a conventional electric heater element 34 is pivotally mounted on the bed plate with its heating grid along the longitudinal axis of the path of travel of the formed tube and which contacts the overlapping portion of the tube 35 as shown in FIGURE 8. It has been found that a spring urged roller 35 mounted on the bed plate 13 and in contact with the bottom of the mandrel assembly is essential to urge the mandrel assembly upwardly so that the overlapped sections of the web material are in close contact with the heating element 34. As the material passes beneath the grid of the heating element 34, the convolute overlapped section 35 as shown in FIGURE 8 is heat sealed together forming the tube. It should be noted that the mandrel assembly 20 supports the tube during the heat sealing process. The mandrel extends at least part way into an air cooler chamber 44 having communication with an electric blower 45. As the advancing tube passes into the cooler 44 its temperature is rapidly decreased and the seal is set. It is essential that the longitudinal seal be set before any further mechanical handling of the same is attempted since separation of the seal would otherwise occur.

All longitudinal movement of the web from the supply roll through the cooling chamber and through the entire tube forming process is brought about by the coaction of vertically opposed drive belts 46 and 47. At least the lower belt 47 has one of its sheaves 48 connected by means of a belt 49 with a drive motor 50 mounted preferably beneath the bed plate by means of a U-shaped bracket 51. It is usually desirable to interconnect the upper and lower belts for conjoint rotation so that the tube may be smoothly pulled through all of the stations previously designated. As a result of vertical pressures on the tube from this driving station, the cross-sectional shape of the convolute tube is flattened as shown in FIGURE 9. In order to compensate for this flattening and to restore the tube shape to its original circular formation as noted in FIGURE 10, a pair of horizontal spaced drive rollers 52 are mounted for rotation on either side of the longitudinal axis of the tube center line. These rollers are connected to the drive motor 50 for rotation. It has been found that best results are achieved when the rollers 52 are driven at approximately two times the speed of the drive belts 46 and 47. It is to be noted here that the convolute tube is not internally supported at this station nor at the driving station and hence, is subject to deformation.

As the endless tube passes from between the rollers 52 in a generally circular configuration, it passes to the barrel 53 of the fly cutter assembly 54. The forward face of the barrel 53 is carefully machined to present a flat face normal to the longitudinal axis of tube travel. This face acts in cooperation with a fly cutter arm 55 to sever the tube into predetermined lengths. The fly cutter arm has a sharpened end 56 and is mounted for rotation in bushing 57 which is supported by bracket 58 on the base plate 13. The rotary fly cutter is driven in timed relationship to the longitudinal movement of the tube by means of mechanical or electrical interconnection with the motor 50. By proper adjustment of speed, the size of the tube segments cut by the fly cutter can be varied. It will be obvious that every time the cutting blade 56 passes against the opening in the end of barrel 53, a segment of the tube passing therethrough will be severed. The severed tube sections will then fall into a feed hopper 59. It will be noted from an examination of FIGURE 1 that hopper 59 is actually mounted on the filling and sealing subassembly of the machine. The fly cutter although physically mounted upon the tube forming subassembly, extends over and above the hopper 59 and hence, all of the severed tubular segments will fall into the hopper where they are disposed at right angles to the longitudinal axis of movement along the filling and sealing subassembly.

As long as a sufficient supply of tubular sections is present in the feed hopper 59, the tube forming subassembly of the machine may be shutdown from time to time for repairs or replacement of the web roll supply 15. The filling and sealing section may continue in operation, however, and is totally independent of the tube forming subassembly.

It will be seen from an inspection of FIGURES 1 and 2 that transfer and movement of the tubular segments from the input at feed hopper 59 to the output, takes place by the action of an endless rubber pocket belt 60. Belt 60 is mounted for rotation about a pair of horizontally disposed sprocket wheels or drive rollers 61 and 62 mounted for rotation above the base plate 13. A drive motor 63 may be connected to either the sprocket 61 or 62, or both. It should be noted that the pocket belt is quite flexible so that the upper run thereof may be twisted 90 degrees from its normal horizontal position as later herein described.

The outer face of the pocket belt is formed with a plurality of spaced apart receptacle receiving grooves. As the rubber pocket belt passes over the sprocket wheels 61 and 62 at the ends of the horizontal travel, the outer face thereof is stretched somewhat so that the openings 64 are widened slightly. One side of the feed hopper 59 is cut away adjacent the bottom thereof so that the end of the pocket belt 60 as it passes about sprocket 61 will enter into the feed hopper to receive severed tubular container portions which will automatically fall into place in alignment with the openings 64. As the pocket belt continues to move the outer face of the belt will return to its normal position and close slightly thereby securing the tubular container therein. It should be noted that the tubular container portions are somewhat longer than the width of the pocket belt and as such extend outwardly on either end of the belt when received within the grooves 64. A pair of upper and lower knurled heating rollers 64$^1$ and 65 receive one of the extending ends of the tubular container segments as they pass therethrough. As can be seen in FIGURE 13, the free end of tubular container 66 is crimped by the rolls 64$^1$–65 and at the same time is heat sealed to provide a fluid tight closure for one end of the tubular container 66. Either or both of the heating rolls can be connected either electrically or mechanically to the drive motor 63.

The upper run of the pocket belt 60 is twisted at its midsection to provide a vertical portion 67. It is during this vertically oriented portion of container and belt travel that the filling operation takes place. Vertical disposition of the belt is achieved by means of spaced vertically mounted guide rolls 68 and 69 which are suitably mounted in bearings supported upon the base plate 13. In order to prevent the containers from falling outwardly on the free side of the pocket belt, a guide rail 70 is provided having curved inlet and outlet portions as can be seen in FIGURE 1.

Mounted medially on the filling and sealing subassembly is a filling hopper 71 located above the vertically oriented belt portion 67. Within this hopper any conventional feed device, such as a vibratory feeder or liquid dispenser, may be incorporated. An overflow box 72 may be mounted directly beneath the feed hopper 71 on the bottom of the base plate 13 to receive any overflow of material when granular material is involved. As the vertically orientated tubular containers pass beneath the feed hopper 71, with their open ends uppermost, the commodity is dispensed and will then fill each container as it passes. Any overflow will fall into the overflow box 72 and can be returned again to the feed hopper by conventional conveyor means (not shown).

The open upper ends of each container are next passed sequentially between an additional pair of knurled heating rollers 73 and 74. These rollers are horizontally disposed and mounted on a vertical axis for rotation in conjunction with the similar rollers 64$^1$ and 65. Drive as with the previous rollers may be taken through the motor 63.

As the containers pass from these rollers within the pocket belt 60, they have been sealed at both ends and are in the form of completed packages. The belt then passes over the guide roll 69 and again resumes its conventional horizontal attitude. As it passes about sprocket 62, the individual filled packages are automically released into a delivery hopper 75.

The finished product as shown at FIGURE 16 is shown at 76 and is ready for final packing into a shipping container or the like. Such dispensing packets aside from their utility as described in the copending application save considerable space when packaged in large numbers in shipping cartons. The machine of the instant invention is capable of producing 1000 packets per minute and may be used for packaging granular material such as salt, pepper, and sugar, as well as for liquid material, such as ketchup, mustard, and mayonnaise.

It will be understood without need of illustration, that any suitable prime mover means may be employed for operating the machine and that suitable gearing or belts may be incorporated in practice to cause the various rolls, drive wheels, sprockets, etc., to effect travel of the web material through the machine in order that the operations of the several component units thereof will be effected in suitable sequence. The various rolls operate to maintain the material under uniform continuous tension throughout the sequence of operation.

The novel method herein disclosed for forming sealed and filled tubular packets consists of initially forming an endless convolute tube from a supply of web material in continuous fashion, forming a longitudinal heat seal along the overlap of the convolute tube as the same is moving, cutting the endless tube into sections of desired length, heat sealing one end of each section, upending the sections into vertical position, filling the sections with the desired material, and finally heat sealing the free end of the tube section to provide the desired package.

While I have shown and described a preferred embodiment of the instant machine, as well as a preferred method for manufacturing a tubular container, it is to be understood that the drawings and detailed disclosure are to be construed in an illustrative, rather than a limiting sense since various modifications and substitutions of equivalents may be made by those skilled in the art within the spirit and scope of the invention as defined in the appended claims.

What I claim as my invention and desire to protect by Letters Patent of the United States is:

1. A machine for forming, filling, and sealing tubular containers comprising, means for supporting a supply of heat sealable web material, means to cause said web supply to travel through said machine, means for forming a continuous convolute tube from said traveling web material, heating means for forming a continuous longitudinal heat seal at the overlap of the convolute tube, said means to cause said web to travel comprising a pair of drive belts on opposite sides of said continuous longitudinally sealed convolute tube and in driving contact therewith, and a pair of spaced apart driven rollers mounted for rotation on axes transverse to the axis of movement of said drive belts, said rollers being driven at a speed greater than the speed of tube movement thereby correcting shape deformation of said convolute tube caused by the action of said drive belts, severing means operable in timed relation to the speed of web material travel to cut said continuous tube into a plurality of container tubes, conveyor means for carrying said conveyor tubes, means to heat seal one end of said container tubes, filling means for dispensing a product into the open end of each container tube, and means to heat seal the open container tube ends.

2. A machine as defined in claim 1 wherein said means for forming the convolute tube comprises an elongated mandrel in alignment with and spaced slightly above the web material and a generally circular die means through which said web material passes, said die means serving to wrap the web material about said mandrel.

3. A machine as defined in claim 2 wherein said mandrel passes through said die means and extends beneath said heating means to provide a support for said convolute tube during longitudinal heat sealing thereof.

4. A machine as defined in claim 1 and further including a cooling chamber intermediate said heating means and said severing means to cool and set said longitudinal heat seal.

5. A machine for forming, filling, and sealing tubular containers comprising, means for supporting a supply of heat sealable web material, means to cause said web supply to travel through said machine, means for forming a continuous convolute tube from said traveling web material, heating means for forming a continuous longitudinal heat seal at the overlap of the convolute tube, severing means operable in timed relation to the speed of web material travel to cut said continuous tube into a plurality of container tubes, hopper means for receiving and storing a supply of container tubes as they are cut from said continuous tube, an endless conveyor belt having a plurality of elongated tube-receiving pockets transversely formed on one face thereof and adapted to pick up and carry container tubes from said hopper means, means to heat seal one end of said container tubes, filling means for dispensing a product into the open end of each container tube, and means to heat seal the open container tube ends.

6. A machine as defined in claim 5 wherein said endless belt is mounted for movement in a horizontal plane and further including belt twister means to change the plane of the belt face from horizontal to vertical for a portion of the belt run.

7. A machine as defined in claim 6 wherein said means to heat seal one end of said container is located adjacent to said endless belt in an area of horizontal belt face position and, said filling means and said means to heat seal the open container tube ends are mounted adjacent to and above said endless belt in an area of vertical belt face position.

8. A machine as defined in claim 1 wherein said means to heat seal the ends of the container tubes comprise opposed pairs of heated knurled rollers through which said container tube ends pass.

9. A machine as defined in claim 5 wherein said endless belt has a face width less than the length of said container tubes.

10. A machine as defined in claim 3 wherein said mandrel is coated with a plastic compound having a relatively low coefficient of friction.

11. A method for forming sealed and filled tubular dispensing packages comprising, forming an endless convolute tube from a supply of heat sealable web material, longitudinally heat sealing along the overlap of the convolute tube while the same is moving, cutting the endless tube into sections of desired length, orienting said tube sections in horizontal side-by-side parallel relation, moving said tube sections, sealing one end of each tube section, orienting said sections into vertical position, filling said tube sections through their open ends, and sealing the open end of each tube.

12. A machine for filling and sealing open-ended cylindrical tubes comprising hopper means for storing a supply of tubes in horizontal position, an endless belt having a plurality of elongated tube receiving pockets transversely formed on one face thereof and adapted to pick up and carry tubes from said hopper means, means to drive said belt, means to seal one end of each tube, belt twist means to twist said belt approximately ninety degrees from its container pickup position so that said tubes are vertically oriented with their sealed ends down, means to fill said tubes with a product, and means to seal the upper ends of said tubes.

References Cited

UNITED STATES PATENTS

| | | | |
|---|---|---|---|
| 2,257,433 | 9/1941 | Stokes | 53—180 X |
| 2,962,843 | 12/1960 | Hoelzer et al. | 53—183 X |
| 3,057,129 | 10/1962 | Meissner | 53—28 |
| 3,326,021 | 2/1966 | Wagner et al. | 53—29 |
| 3,354,601 | 11/1967 | Schneider et al. | 53—29 X |

THERON E. CONDON, *Primary Examiner.*

E. F. DESMOND, *Assistant Examiner.*

U.S. Cl. X.R.

53—183